(12) United States Patent
Hong et al.

(10) Patent No.: US 11,648,539 B2
(45) Date of Patent: May 16, 2023

(54) CATALYST FOR GASOLINE SYNTHESIS FROM DIMETHYL ETHER, METHOD FOR PREPARING THE SAME, AND METHOD FOR PREPARING GASOLINE USING THE SAME

(71) Applicants: HYUNDAI MOTOR COMPANY, Seoul (KR); KIA CORPORATION, Seoul (KR); Research & Business Foundation SUNGKYUNKWAN UNIVERSITY, Suwon-si (KR)

(72) Inventors: Chae Hwan Hong, Seoul (KR); Jin Woo Choung, Suwon-si (KR); Young Gul Hur, Uiwang-si (KR); Jong Wook Bae, Suwon-si (KR); Jong Jin Kim, Suwon-si (KR)

(73) Assignees: HYUNDAI MOTOR COMPANY, Seoul (KR); KIA CORPORATION, Seoul (KR); RESEARCH & BUSINESS FOUDATION SUNGKYUNKWAN UNI., Suwon-si (KR)

( * ) Notice: Subject to any disclaimer, the term of this patent is extended or adjusted under 35 U.S.C. 154(b) by 0 days.

(21) Appl. No.: 17/465,482

(22) Filed: Sep. 2, 2021

(65) Prior Publication Data
US 2022/0347662 A1 Nov. 3, 2022

(30) Foreign Application Priority Data

Apr. 29, 2021 (KR) ........................ 10-2021-0055655

(51) Int. Cl.
| | |
|---|---|
| *C01B 39/02* | (2006.01) |
| *B01J 29/40* | (2006.01) |
| *B01J 37/30* | (2006.01) |
| *B01J 37/10* | (2006.01) |
| *B01J 37/06* | (2006.01) |
| *B01J 37/04* | (2006.01) |
| *B01J 29/65* | (2006.01) |
| *C10G 3/00* | (2006.01) |
| *B01J 37/08* | (2006.01) |
| *C01B 39/44* | (2006.01) |
| *C01B 39/04* | (2006.01) |
| *C01B 39/40* | (2006.01) |
| *C01B 39/38* | (2006.01) |
| *B01J 37/03* | (2006.01) |
| *B01J 29/06* | (2006.01) |

(52) U.S. Cl.
CPC .............. B01J 29/40 (2013.01); B01J 29/65 (2013.01); B01J 37/036 (2013.01); B01J 37/04 (2013.01); B01J 37/06 (2013.01); B01J 37/082 (2013.01); B01J 37/10 (2013.01); B01J 37/30 (2013.01); C01B 39/02 (2013.01); C01B 39/023 (2013.01); C01B 39/04 (2013.01); C01B 39/38 (2013.01); C01B 39/40 (2013.01); C01B 39/44 (2013.01); C01B 39/445 (2013.01); C10G 3/49 (2013.01); *B01J 2029/062* (2013.01); *C10G 2300/70* (2013.01); *C10G 2400/02* (2013.01)

(58) Field of Classification Search
CPC ... B01J 29/40; B01J 29/80; B01J 29/65; B01J 37/04; B01J 37/06; B01J 37/082; B01J 37/10; B01J 37/30; B01J 37/036; B01J 2029/062; C01B 39/02; C01B 39/023; C01B 39/04; C01B 39/38; C01B 39/40; C01B 39/44; C01B 39/445; C10G 3/49; C10G 2300/70; C10G 2400/02
USPC ............ 502/60, 63, 64, 67, 71, 77; 423/700, 423/701, 702, 703, 704, 710
See application file for complete search history.

(56) References Cited

U.S. PATENT DOCUMENTS

| | | | |
|---|---|---|---|
| 3,928,483 A | 12/1975 | Chang et al. | |
| 4,011,275 A | 3/1977 | Zahner | |
| 4,138,442 A | 2/1979 | Chang et al. | |
| 5,785,947 A * | 7/1998 | Zones | ..................... C01B 39/04 423/706 |
| 8,748,500 B2 | 6/2014 | Goetsch et al. | |
| 2017/0137720 A1 | 5/2017 | Harandi et al. | |

FOREIGN PATENT DOCUMENTS

| | | |
|---|---|---|
| JP | H4-51596 B2 | 8/1992 |
| JP | 2017-507773 A | 3/2017 |
| KR | 10-2012-0123305 A | 11/2012 |
| KR | 10-2014-0064703 A | 5/2014 |
| WO | WO 2001-029152 A1 | 4/2001 |

OTHER PUBLICATIONS

Xu et al., "advances in the Synthesis of Ferrierite Zeolite", Molecules, 2020, 25, 3722, pp. 1-19.*

* cited by examiner

*Primary Examiner* — Elizabeth D Wood
(74) *Attorney, Agent, or Firm* — McDonnell Bohnen Hulbert & Berghoff LLP

(57) ABSTRACT

Disclosed is a method for preparing a catalyst for a gasoline reaction of dimethyl ether that includes reacting a silica source, an aluminum source, and a structural derivative to synthesize a zeolite sol, mixing an alcohol with an organic template to form an emulsion phase, and adding a zeolite sol to the emulsion phase to perform a reaction.

7 Claims, 37 Drawing Sheets

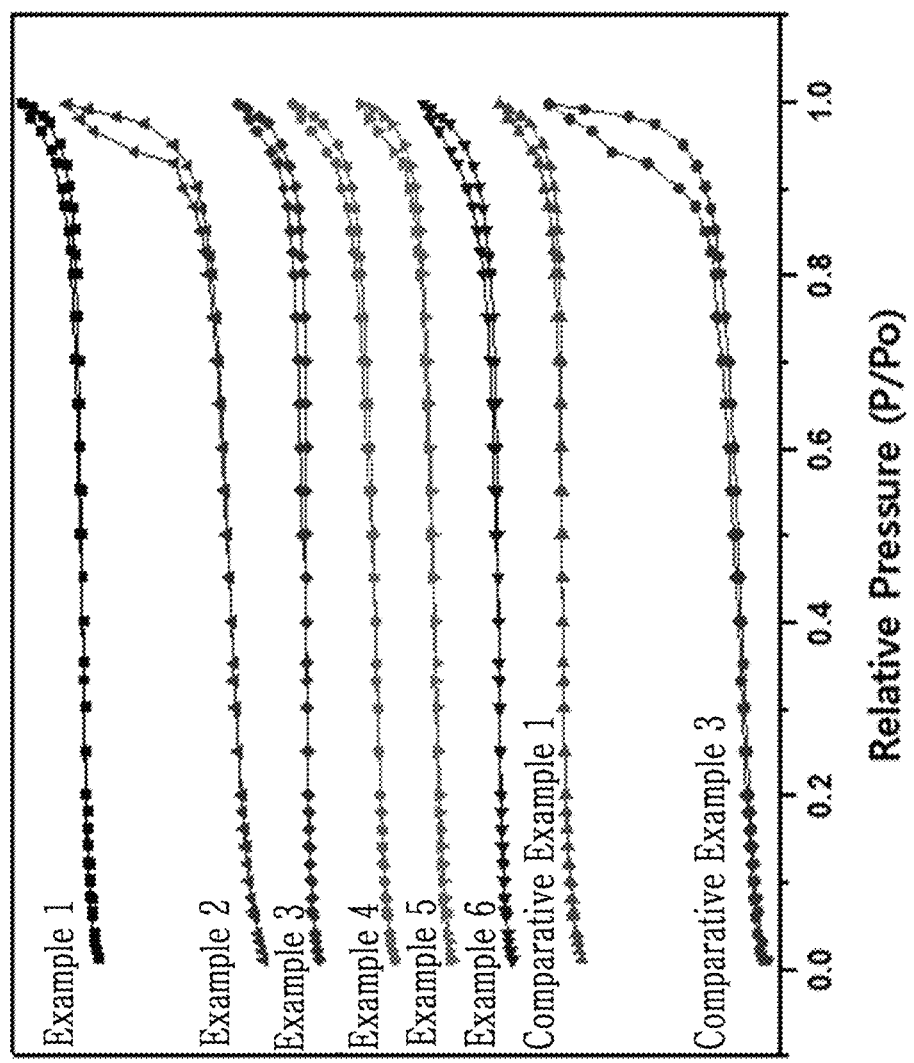

CATALYST FOR GASOLINE SYNTHESIS FROM DIMETHYL ETHER, METHOD FOR PREPARING THE SAME, AND METHOD FOR PREPARING GASOLINE USING THE SAME

CROSS-REFERENCE TO RELATED APPLICATION

This application claims priority to and the benefit of Korean Patent Application No. 10-2021-0055655 filed in the Korean Intellectual Property Office on Apr. 29, 2021, the entire contents of which are incorporated herein by reference.

BACKGROUND

(a) Field

The present disclosure relates to a catalyst for gasoline reaction of dimethyl ether, a method for preparing the same, and a method for preparing gasoline using the same and more particularly, a catalyst that exhibits excellent activity in a reaction of synthesizing gasoline from dimethyl ether, can increase a production of C8 in the gasoline region, and enables more stable catalyst operation to prevent catalyst deactivation, a method for preparing the same, and a method for preparing gasoline using the same.

(b) Description of the Related Art

Due to depletion of fossil fuels and global warming by $CO_2$ emissions, alternative energy production is becoming increasingly important.

In particular, since the $CO_2$ emissions are being internationally regulated, a method of producing gasoline from $CO_2$ through methanol/dimethylether among the methods of reducing the $CO_2$ emissions is attracting attention.

This reaction uses dimethylether obtained from $CO_2$, a greenhouse gas and effectively synthesizes gasoline used as a fuel and thus is environmentally-friendly and in addition, reduces carbon charges and thus is economical.

The gasoline production reaction using dimethylether obtained from $CO_2$ is as follows.

[Reaction Scheme 1] Synthesis of Methanol from $CO_2$ (Methanol Synthesis)

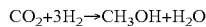

$CO_2 + 3H_2 \rightarrow CH_3OH + H_2O$

[Reaction Scheme 2] Synthesis of Dimethyl Ether (Alcohol Dehydration)

$2CH_3OH \rightarrow CH_3OCH_3 + H_2O$

[Reaction Scheme 3] Synthesis of Gasoline from Dimethyl Ether (DME to Hydrocarbon)

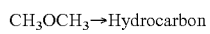

$CH_3OCH_3 \rightarrow \text{Hydrocarbon}$

The most essential reaction in this three-step reaction is the synthesis reaction of gasoline region from dimethyl ether in the third reaction. Herein, gasoline, a high value-added product, is produced, and selectivity of the product having a carbon number of C5 or more which corresponds to the gasoline region should be increased.

Accordingly, it is important in the commercialization of this process to solve problems of Reaction Scheme 3 rather than Reaction Schemes 1 and 2 which produce a relatively less valuable product and less require selectivity adjustment of the product.

SUMMARY

The present disclosure provides a catalyst that exhibits improved activity in the reaction of synthesizing gasoline from dimethyl ether, can increase the production of C8 in the gasoline region, and enables more stable catalyst operation capable of preventing deactivation of the catalyst.

The present disclosure also provides a method for preparing a catalyst for a gasoline reaction of dimethyl ether in which crystals may be formed more efficiently by forming an emulsion phase in order to introduce a ferrierite structure, thereby increasing reactivity due to changes in acid sites and structural characteristics, and selectivity of a specific gasoline region.

The present disclosure also provides a method for synthesizing gasoline from dimethyl ether using the catalyst.

According to an embodiment, a method for preparing a catalyst for a gasoline reaction of dimethyl ether includes reacting a silica source, an aluminum source, and a structural derivative to synthesize a zeolite sol, mixing an alcohol with an organic template to form an emulsion phase, and adding a zeolite sol to the emulsion phase to perform a reaction.

The structural derivative may be a nitrogen-containing heterocyclic compound including pyrrolidine, piperidine, or a combination thereof.

The alcohol may include ethanol, propanol, butanol, heptanol, or a combination thereof.

The organic template may be an organic compound including 15 to 30 carbons and at least one nitrogen.

The organic template may include cetrimonium bromide (CTAB), sodium dodecyl sulfate, ammonium lauryl sulfate, or a combination thereof.

The emulsion phase may be formed by mixing about 5 parts by weight to about 15 parts by weight of alcohol based on 1 part by weight of the organic template.

The zeolite sol may be added dropwise to the emulsion phase.

The zeolite synthesis reaction may be performed at about 140° C. to about 160° C. for about 48 hours to about 336 hours.

The method for preparing the catalyst for the gasoline reaction of dimethyl ether may further include exchanging the Na-form zeolite produced in the zeolite synthesis reaction with a cation to prepare an $NH_3$-form zeolite.

The method for preparing the catalyst for the gasoline reaction of dimethyl ether may further include converting the ion-exchanged zeolite into H-from zeolite by reacting the ion-exchanged zeolite at about 450° C. to about 650° C. for about 3 hours to about 6 hours.

According to another embodiment, a catalyst for gasoline reaction of dimethyl ether includes a zeolite having a ferrierite (FER) structure and a ZSM-5 structure.

In the zeolite, the ferrierite (FER) structure and the ZSM-5 structure may be mixed in a mole ratio of about 1:0.01 to about 1:2.

A Si/Al mole ratio of the zeolite may be about 5 to about 15.

According to another embodiment, a method of preparing gasoline includes preparing gasoline through the gasoline reaction of dimethyl ether using the catalyst.

The catalyst shows excellent activity in the reaction of synthesizing gasoline from dimethyl ether, can increase the production of C8 in the gasoline region, and enables more stable catalyst operation to prevent catalyst deactivation.

The method for preparing the catalyst for the gasoline reaction of dimethyl ether can form crystals more efficiently by forming an emulsion phase to introduce a ferrierite structure, and thereby reactivity may increase and selectivity of a particular gasoline region may increase due to changes in acid sites and structural characteristics.

BRIEF DESCRIPTION OF THE DRAWINGS

FIG. 15 is a graph showing analysis results of the specific surface areas of the zeolite catalysts measured in Experimental Example 5.

DETAILED DESCRIPTION

Figure 1A:
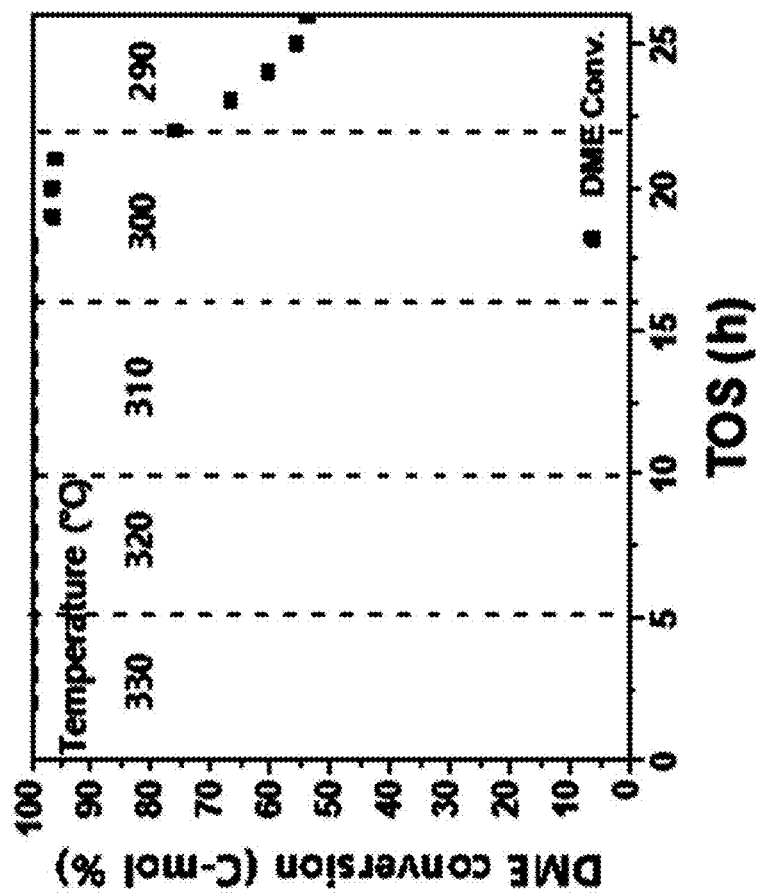
FIGS. 1A, 1B, and 1C are graphs showing the dimethyl ether conversion rate and the selectivity pattern of C1 to C5 or more of the catalyst prepared in Example 1.
Figure 1B:
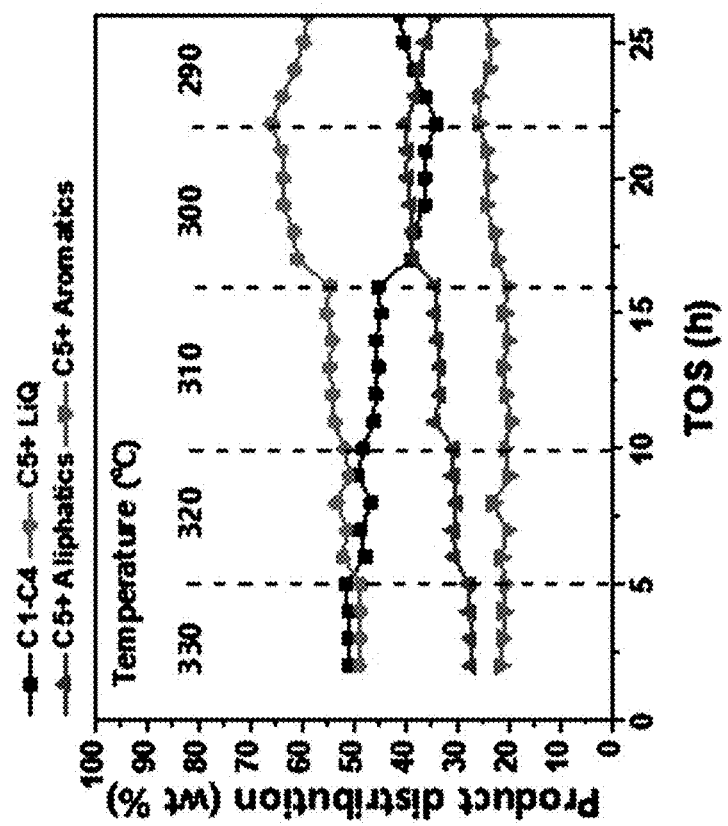
Figure 1C:
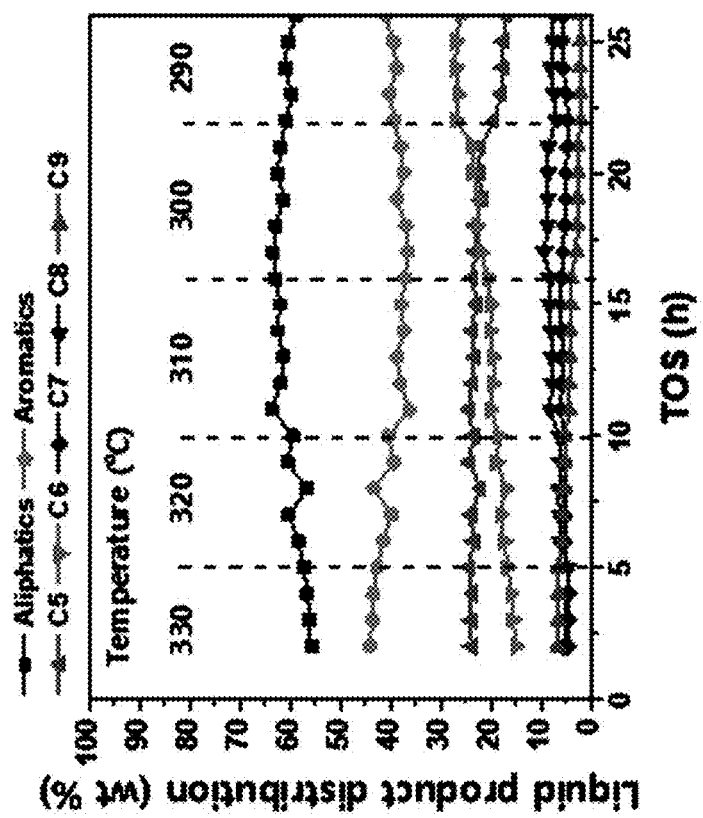
Figure 2A:
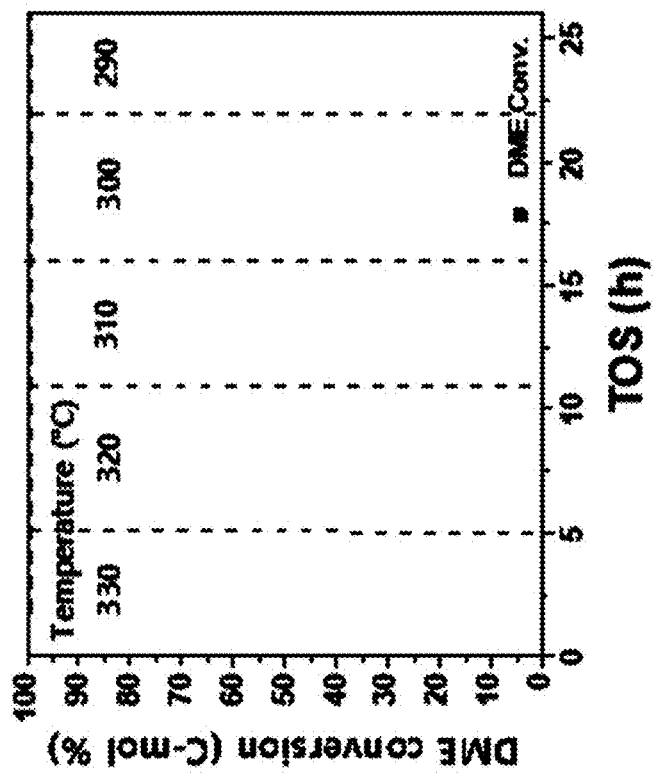
FIGS. 2A, 2B, and 2C are graphs showing the dimethyl ether conversion rate and the selectivity pattern of C1 to C5 or more of the catalyst prepared in Example 2.
Figure 2B:
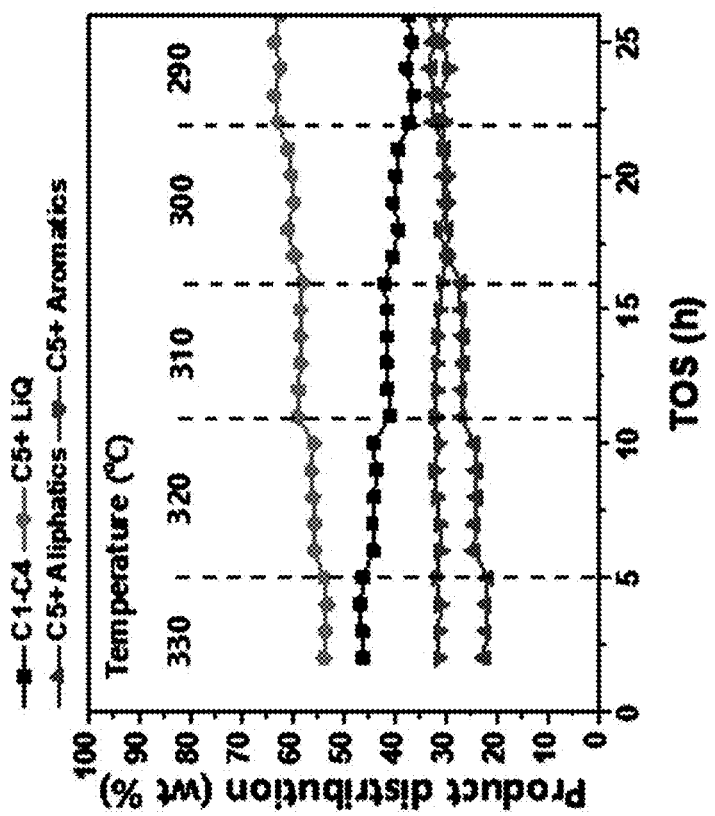
Figure 2C:
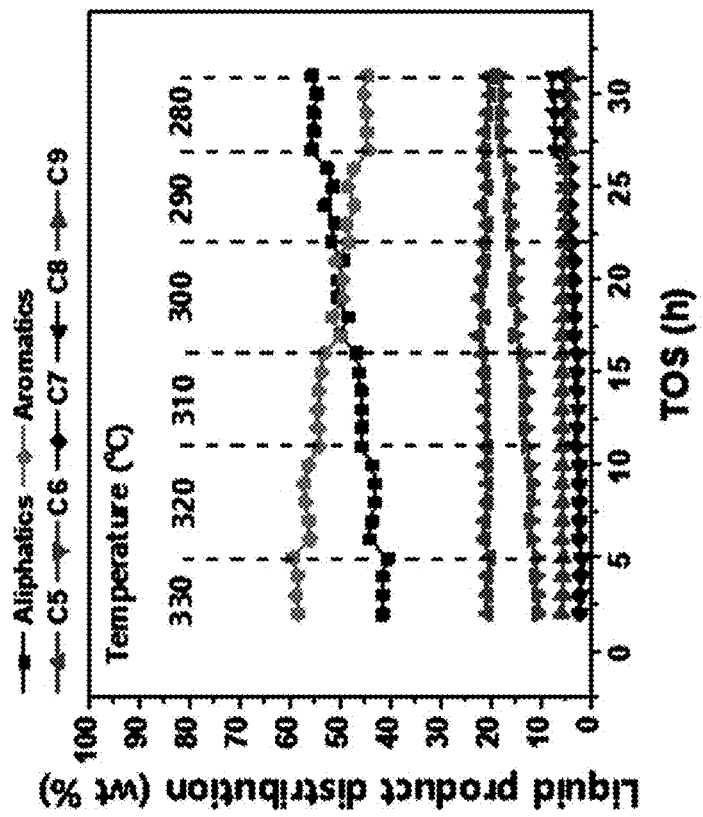
Figure 3A:
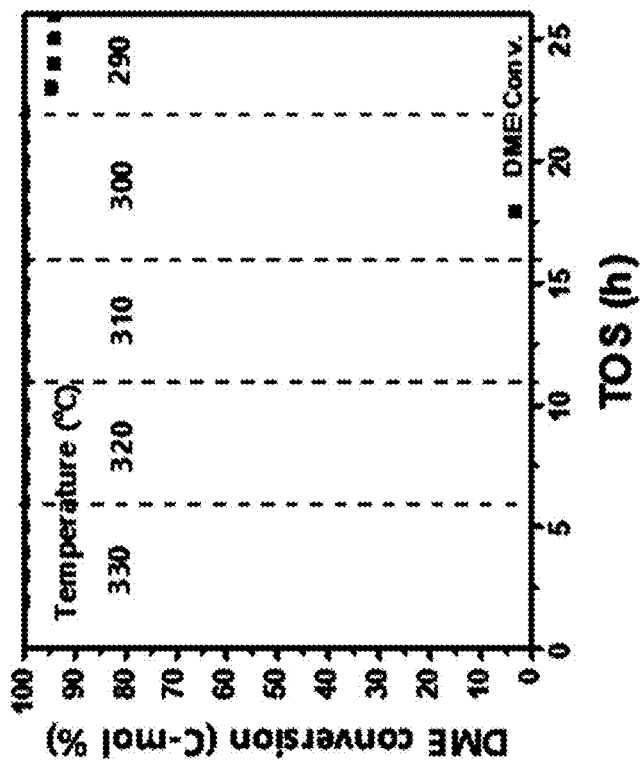
FIGS. 3A, 3B, and 3C are graphs showing the dimethyl ether conversion rate and the selectivity pattern of C1 to C5 or more of the catalyst prepared in Example 3.
Figure 3B:
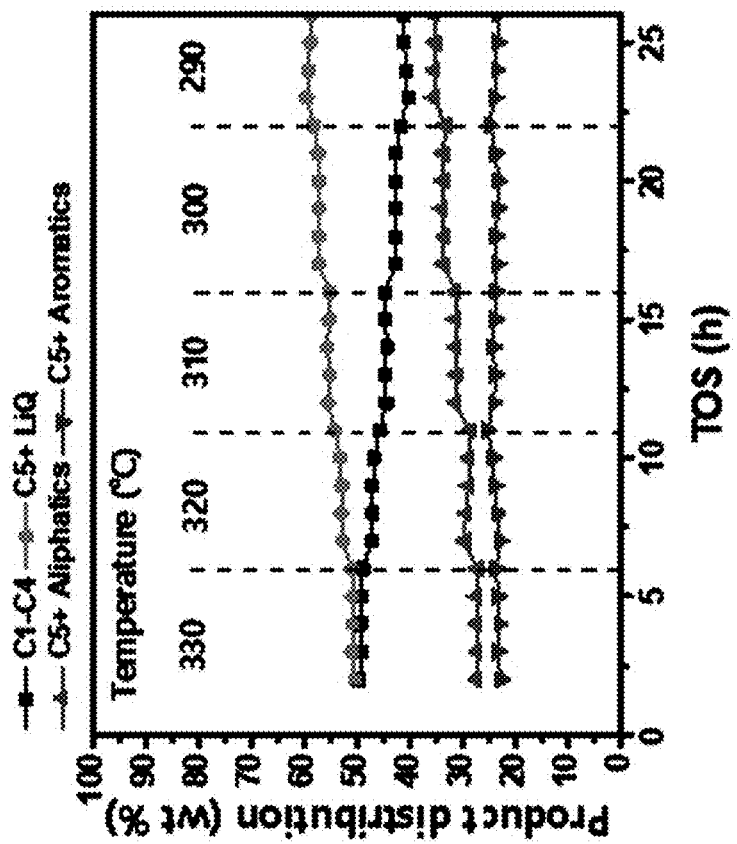
Figure 3C:
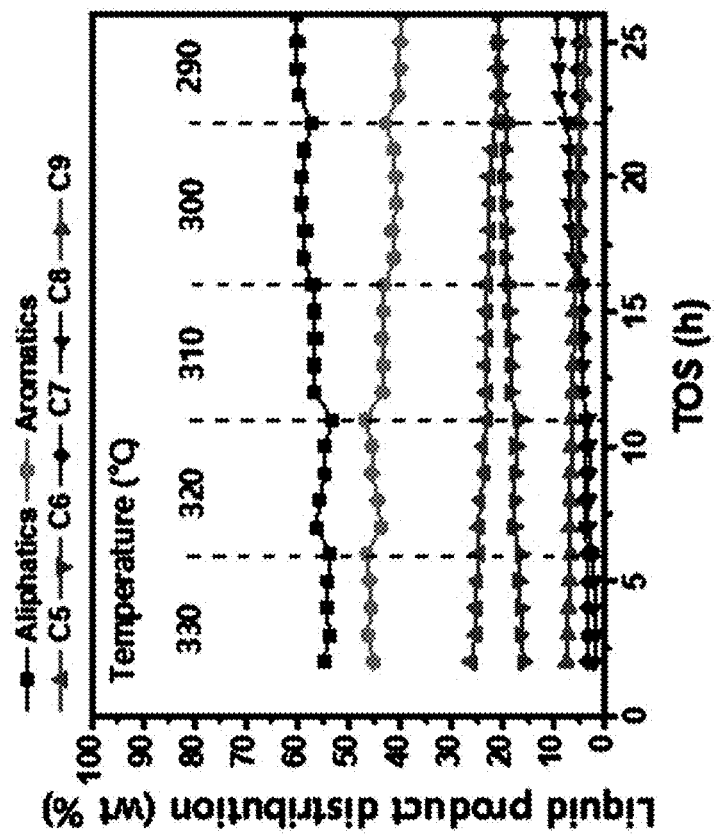
Figure 4A:
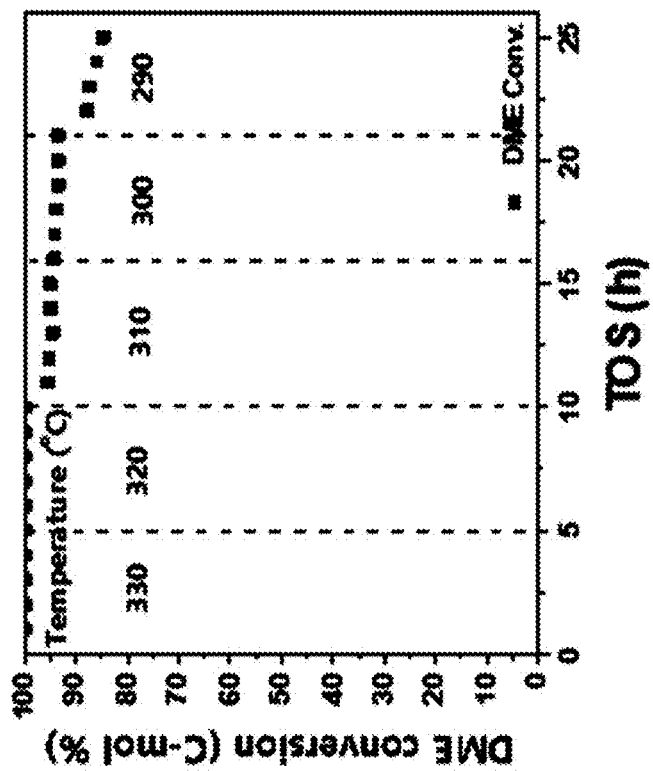
FIGS. 4A, 4B, and 4C are graphs showing the dimethyl ether conversion rate and the selectivity pattern of C1 to C5 or more of the catalyst prepared in Example 4.
Figure 4B:
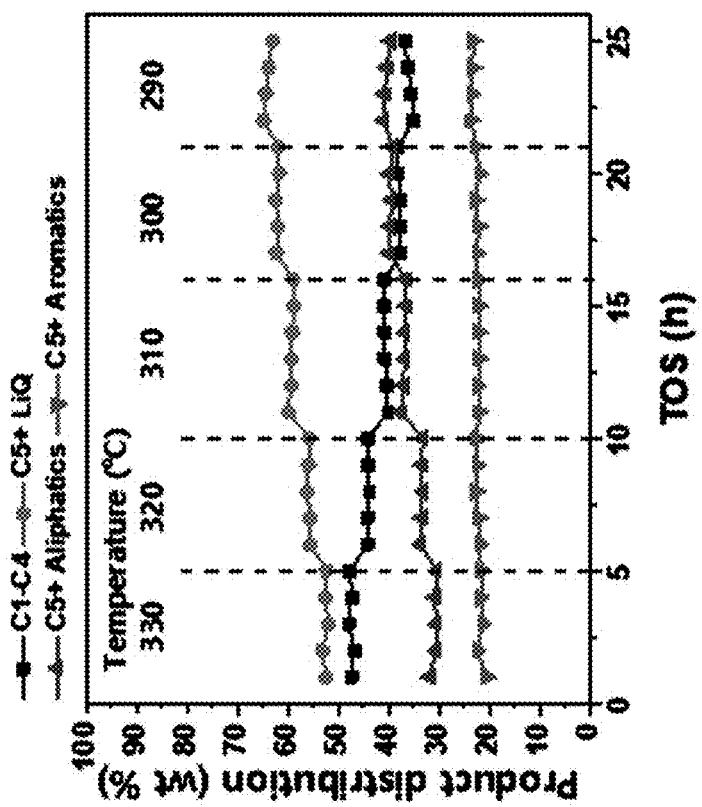
Figure 4C:
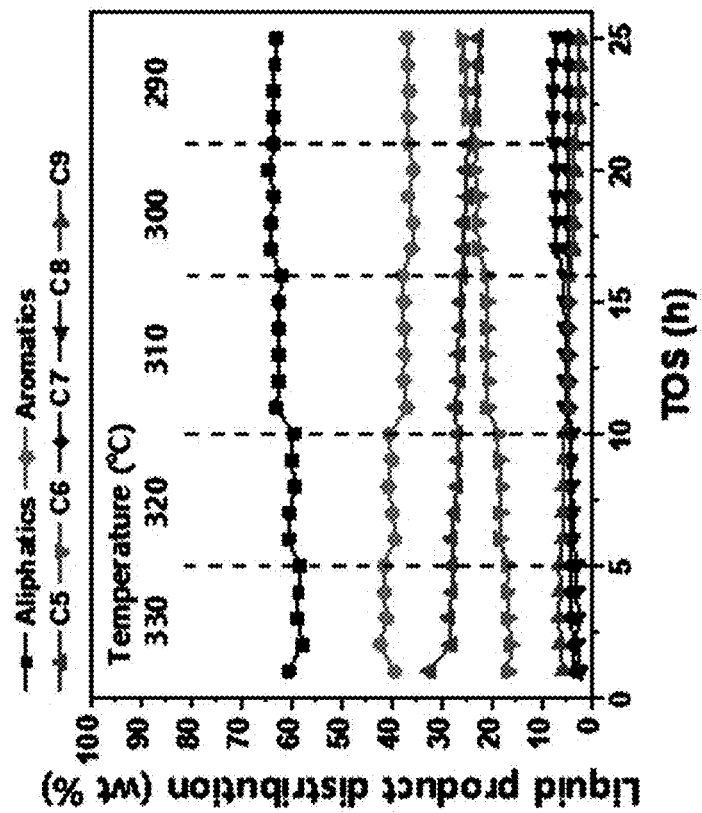
Figure 5A:
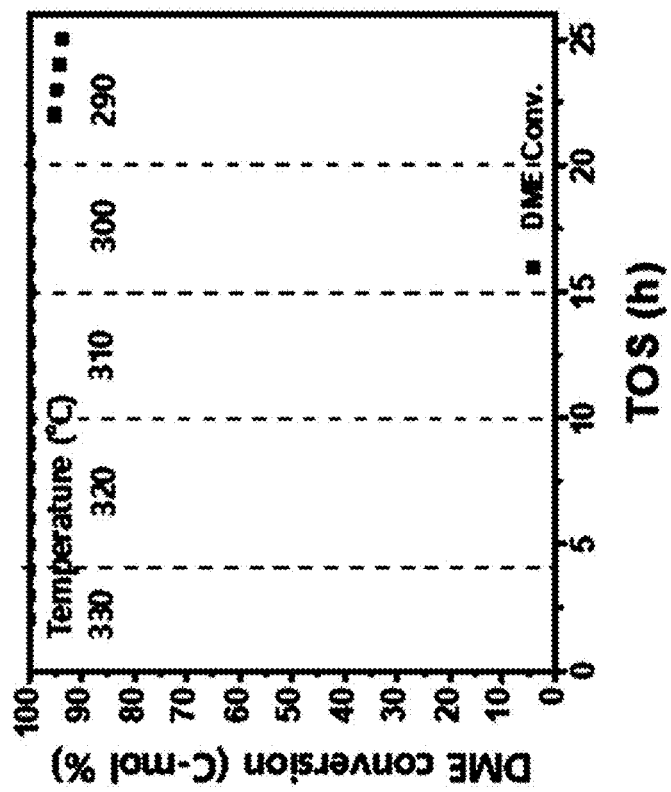
FIGS. 5A, 5B, and 5C are graphs showing the dimethyl ether conversion rate and the selectivity pattern of C1 to C5 or more of the catalyst prepared in Example 5.
Figure 5B:
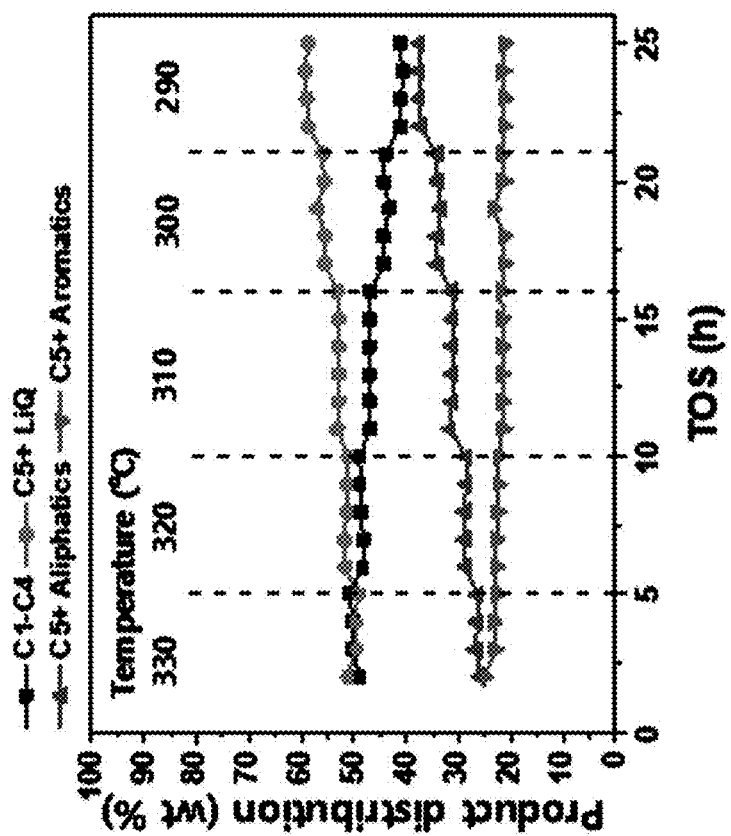
Figure 5C:
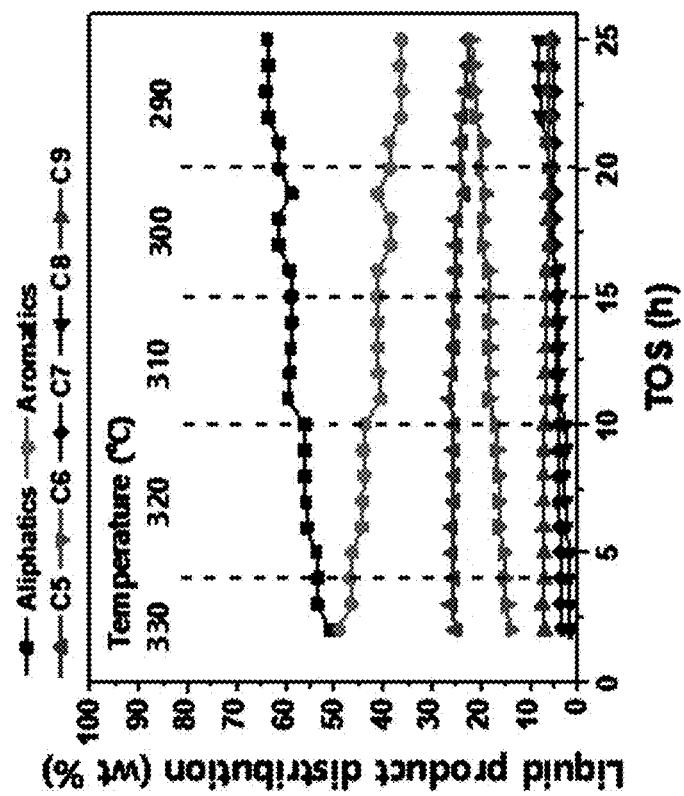
Figure 6A:
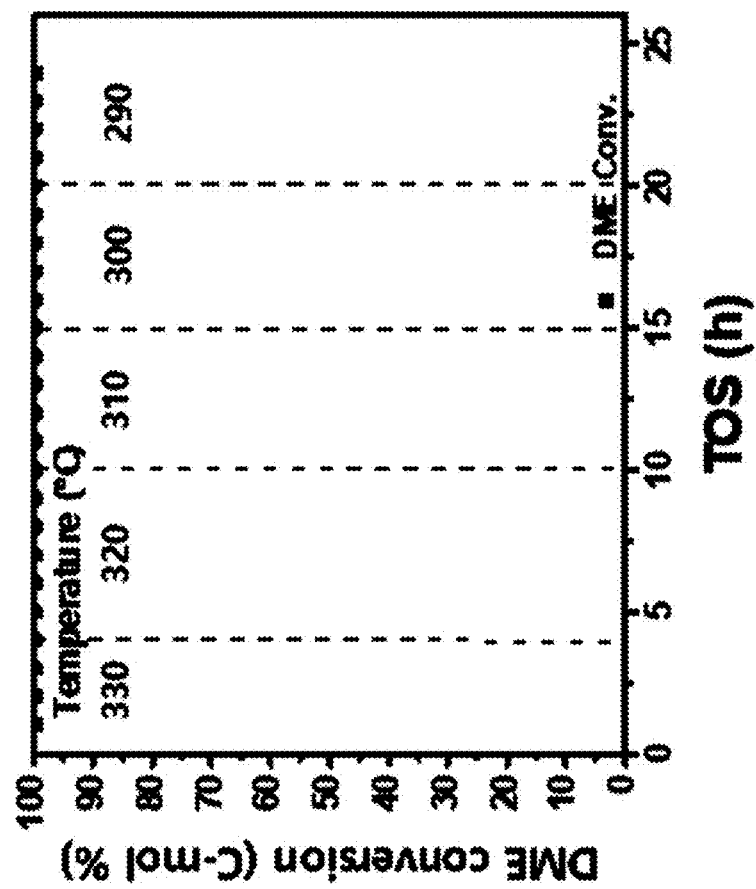
FIGS. 6A, 6B, and 6C are graphs showing the dimethyl ether conversion rate and the selectivity pattern of C1 to C5 or more of the catalyst prepared in Example 6.
Figure 6B:
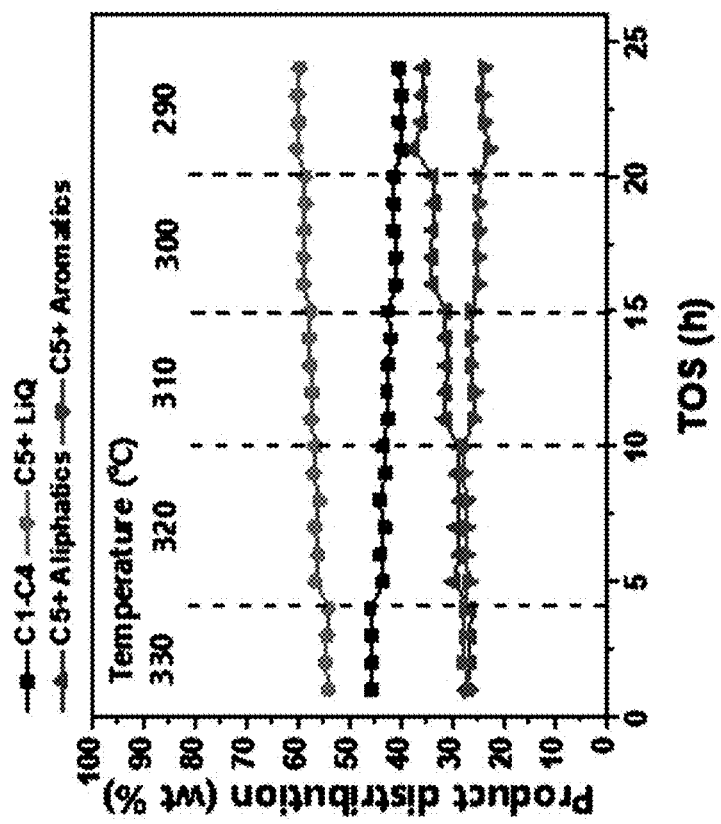
Figure 6C:
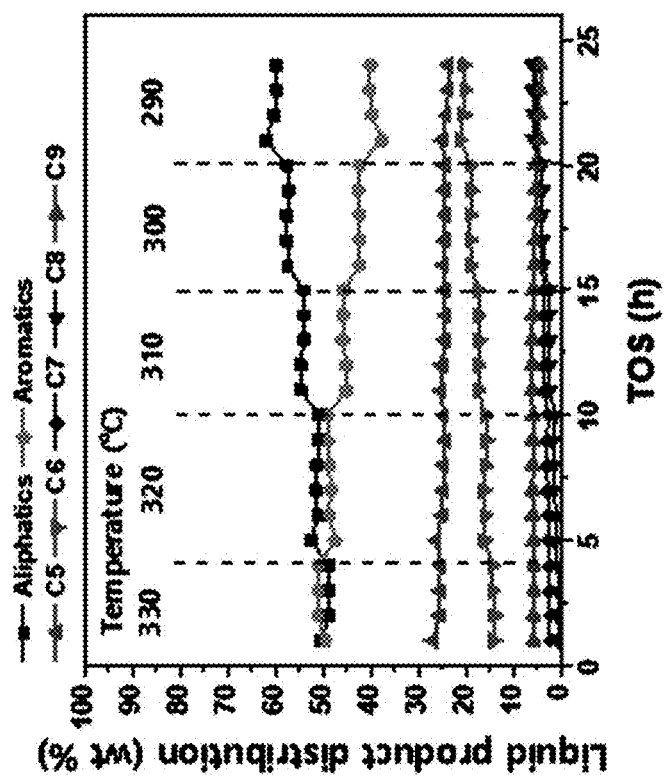
Figure 7A:
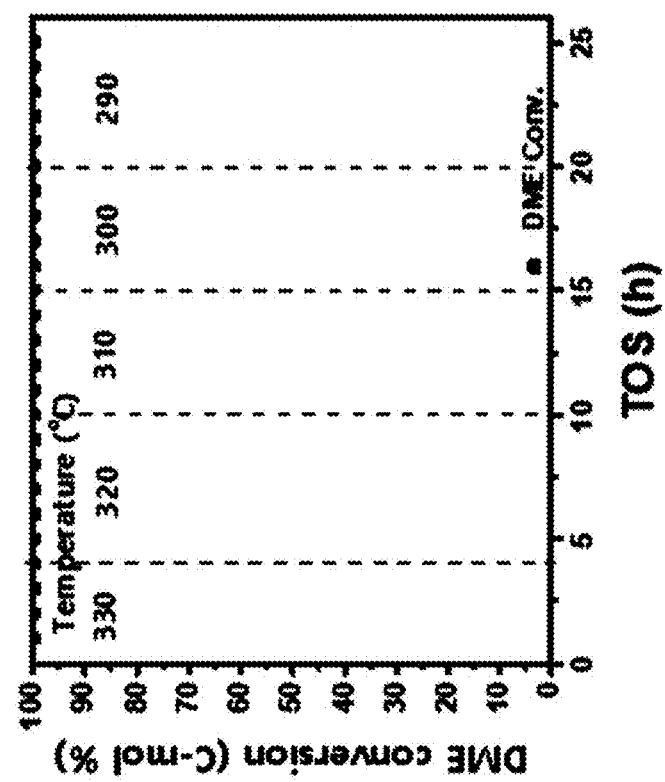
FIGS. 7A, 7B, and 7C are graphs showing the dimethyl ether conversion rate and the selectivity pattern of C1 to C5 or more of the catalyst prepared in Example 7.
Figure 7B:
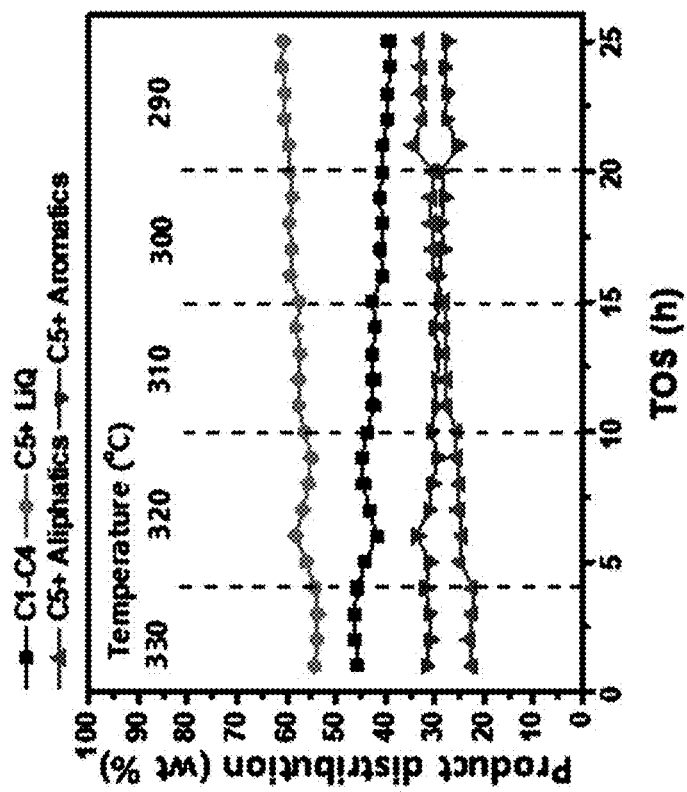
Figure 7C:
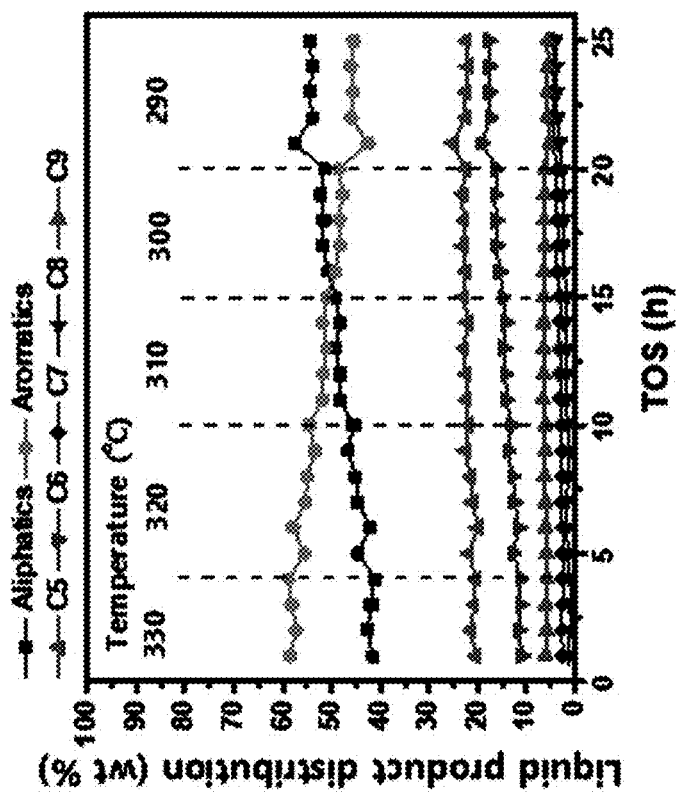
Figure 8A:
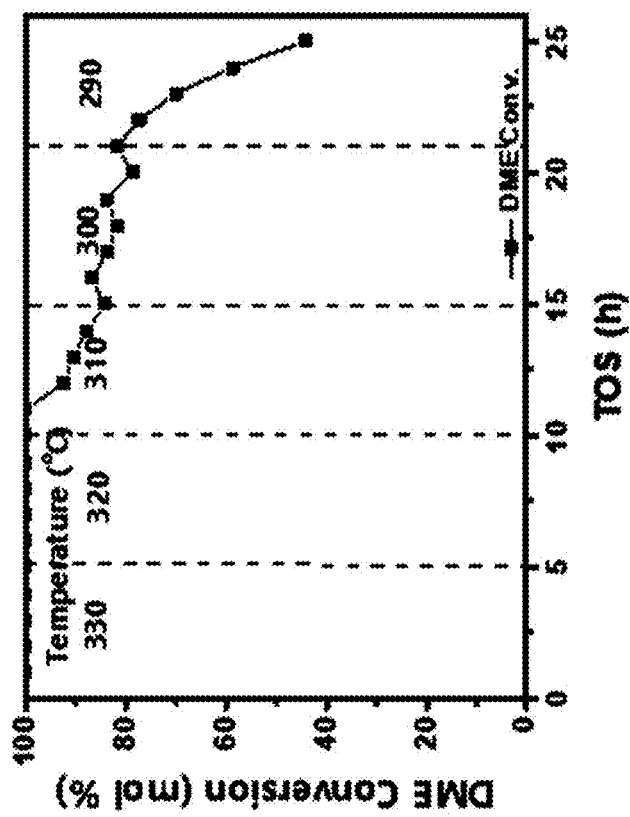
FIGS. 8A, 8B, and 8C are graphs showing the dimethyl ether conversion rate and the selectivity pattern of C1 to C5 or more of the catalyst prepared in Comparative Example 1.
Figure 8B:
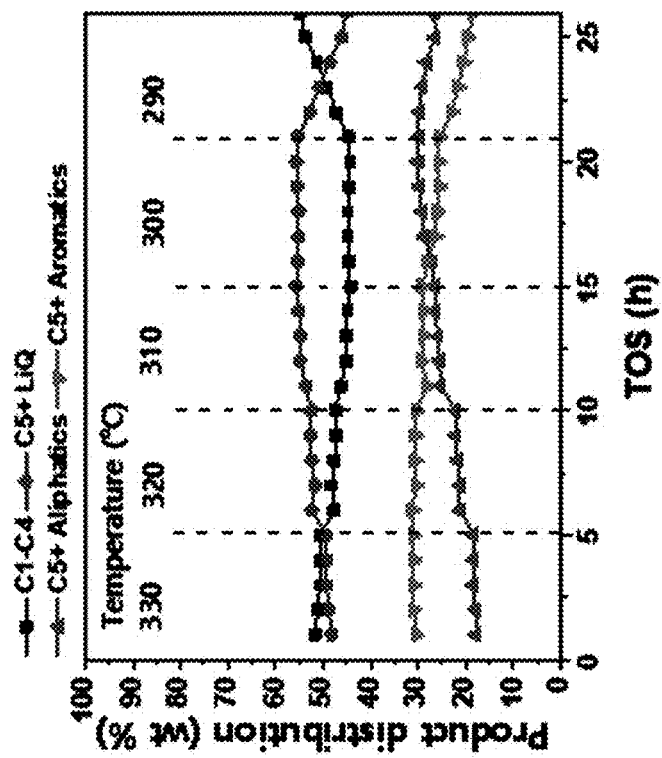
Figure 8C:
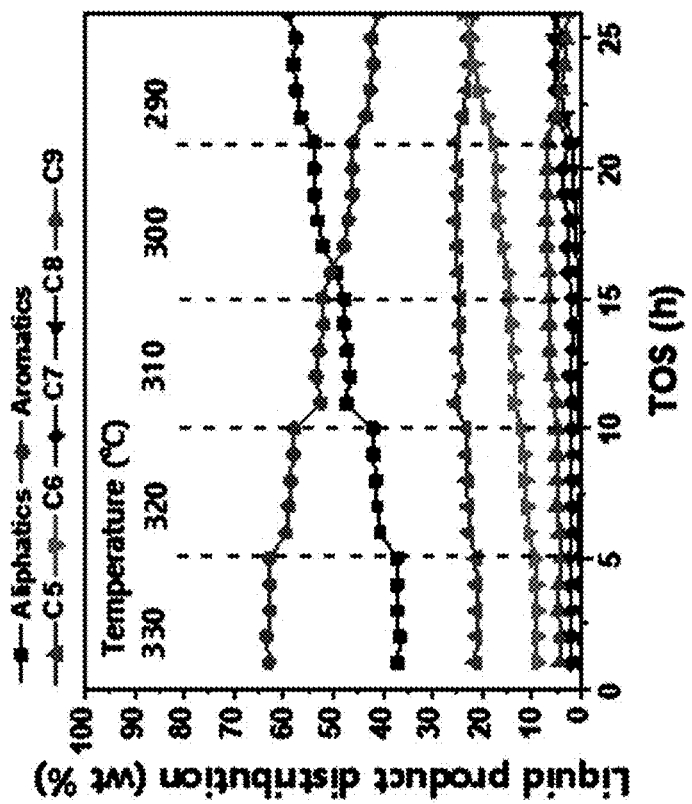
Figure 9A:
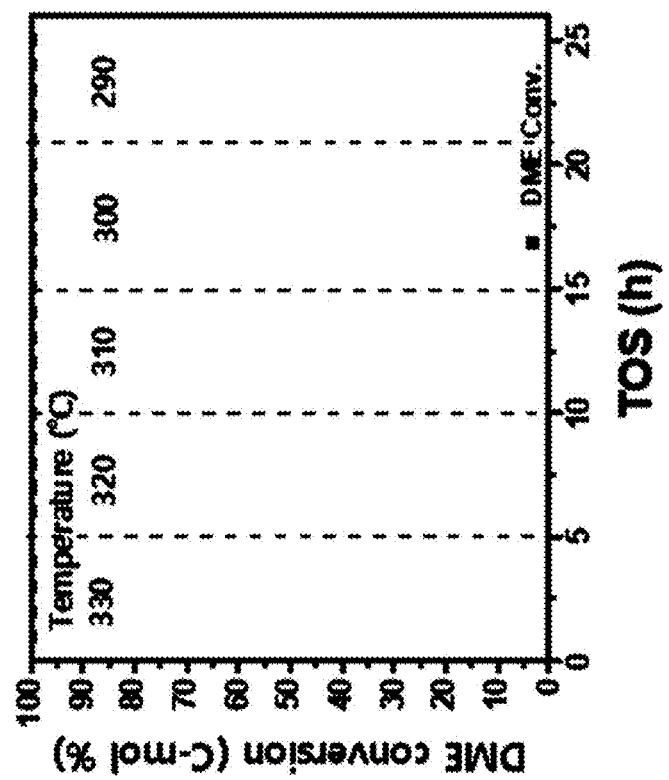
FIGS. 9A, 9B, and 9C are graphs showing the dimethyl ether conversion rate and the selectivity pattern of C1 to C5 or more of the catalyst prepared in Comparative Example 2.
Figure 9B:
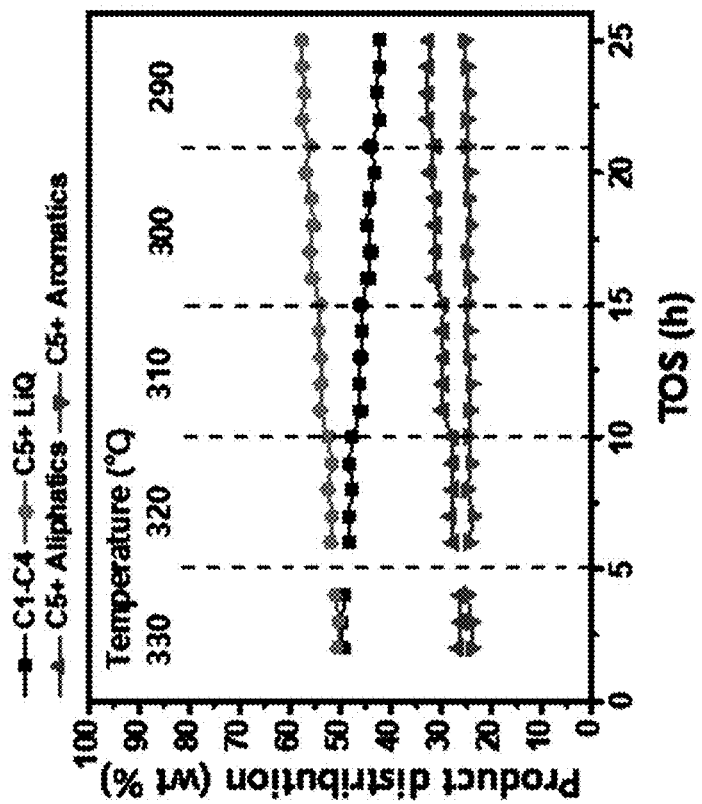
Figure 9C:
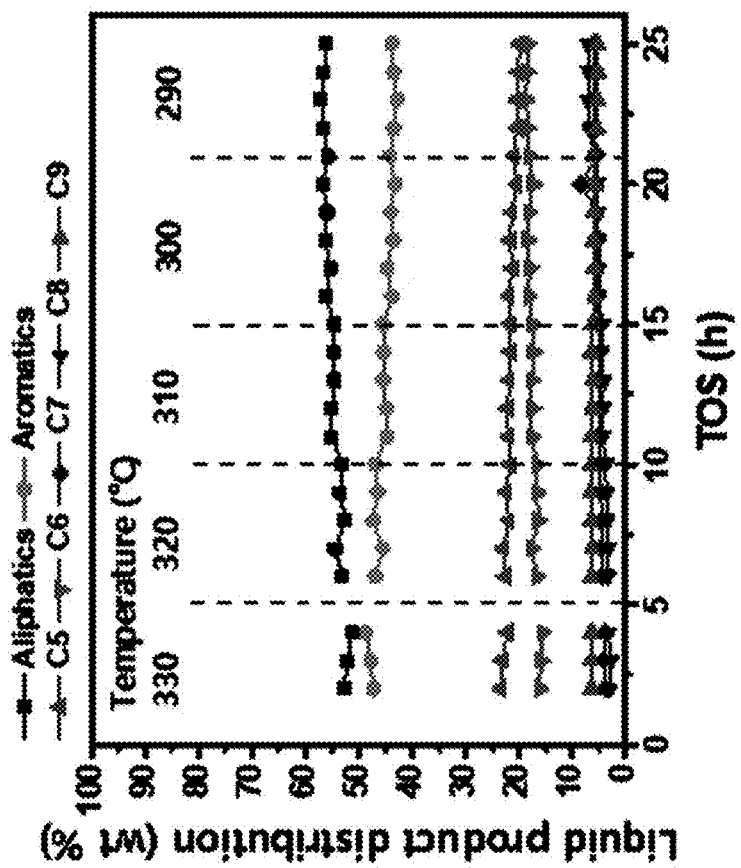
Figure 10A:
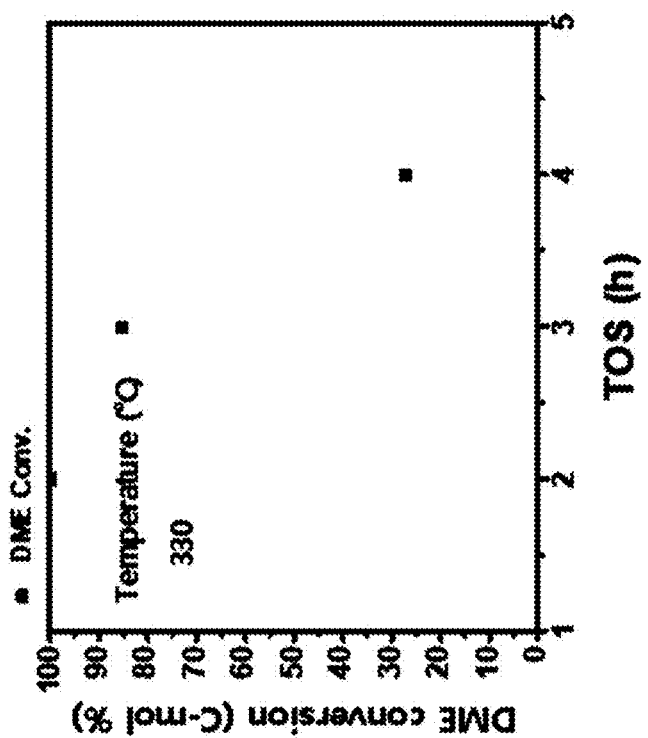
FIGS. 10A, 10B, and 10C are graphs showing the dimethyl ether conversion rate and the selectivity pattern of C1 to C5 or more of the catalyst prepared in Comparative Example 3.
Figure 10B:
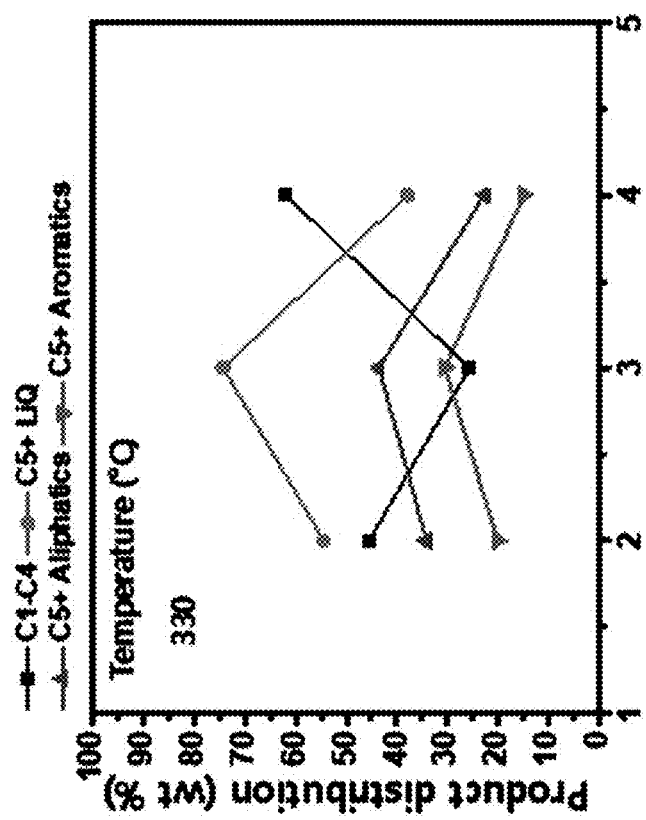
Figure 10C:
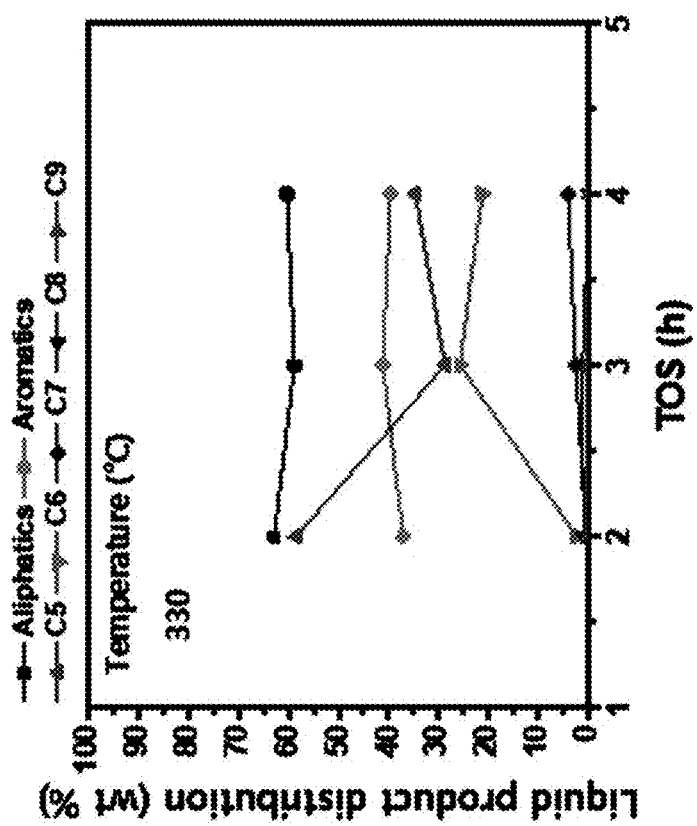
Figure 11A:
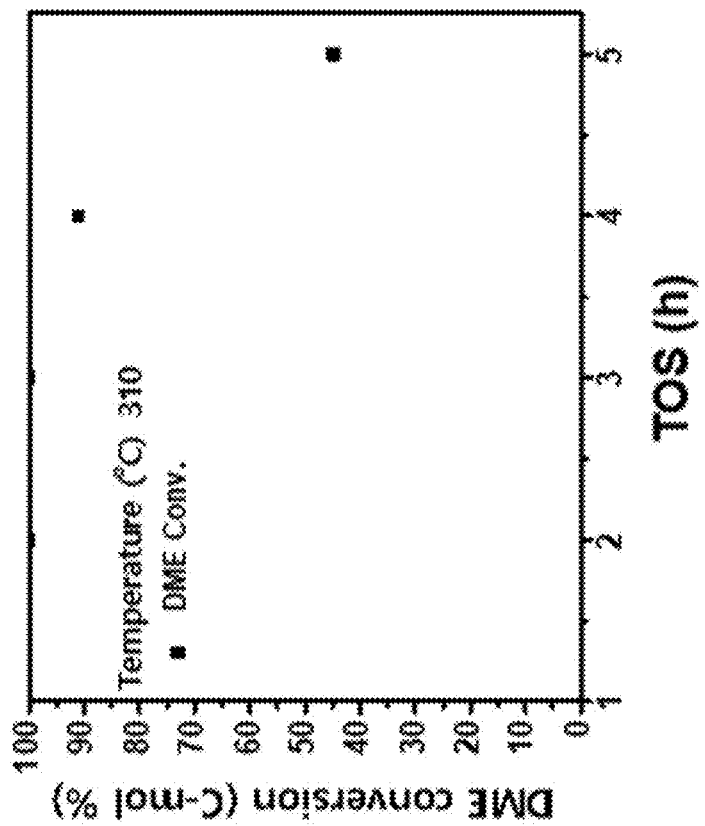
FIGS. 11A, 11B, and 11C are graphs showing the dimethyl ether conversion rate and the selectivity pattern of C1 to C5 or more of the catalyst prepared in Comparative Example 4.
Figure 11B:
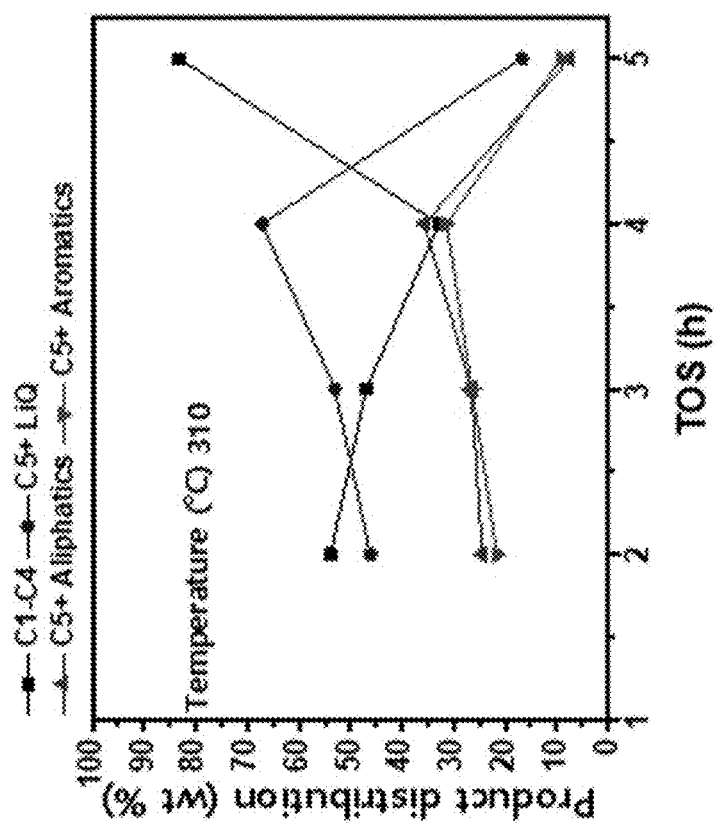
Figure 11C:
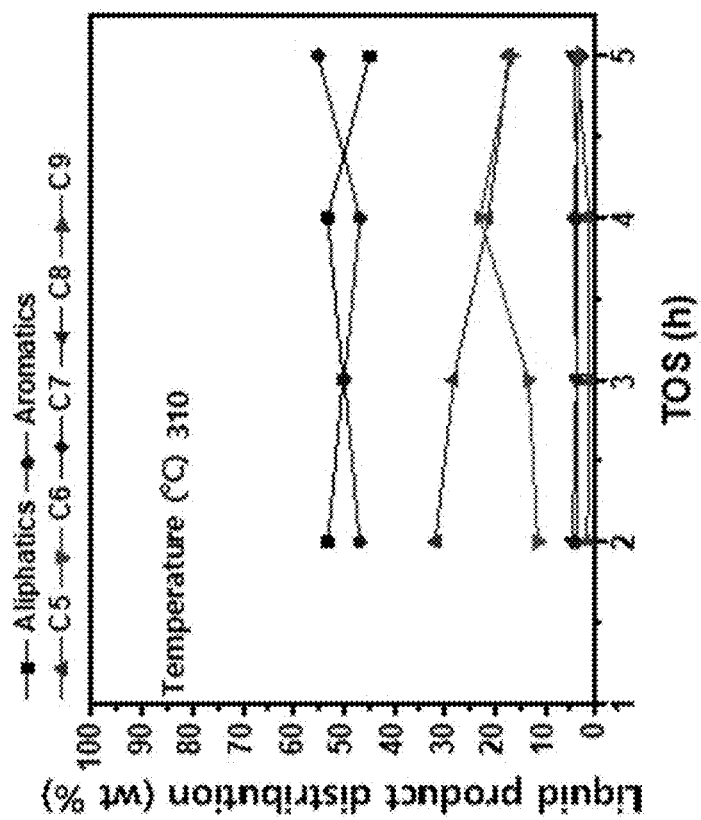

The advantages and features of the present disclosure and the methods for accomplishing the same will be apparent from the embodiments described hereinafter with reference to the accompanying drawings. However, an implemented form may not be limited to exemplary embodiments disclosed below. Unless otherwise defined, all terms (including technical and scientific terms) used herein have the same meaning as commonly understood by one of ordinary skill in the art. In addition, terms defined in a commonly used dictionary are not to be ideally or excessively interpreted unless explicitly defined.

In addition, unless explicitly described to the contrary, the word "comprise", and variations such as "comprises" or "comprising," will be understood to imply the inclusion of stated elements but not the exclusion of any other elements.

Further, the singular includes the plural unless mentioned otherwise.

A method for preparing a catalyst for a gasoline reaction of dimethyl ether according to an embodiment includes synthesizing a zeolite sol, forming an emulsion phase, and adding the zeolite sol to the emulsion phase to perform a hydrothermal synthesis.

The zeolite sol may be synthesized by reacting a silica source, an aluminum source, and a structural derivative.

The silica source may include silica sol, silica gel, silica hydrogel, silica hydroxide, fumed silica, precipitated silica, sodium silicate, tetraalkylorthosilicate, or a combination thereof.

The aluminum source may include sodium aluminate ($NaAlO_2$), $AlCl_3$, $Al_2(SO_4)_3$, aluminum hydroxide ($Al(OH)_3$), kaolin, clay, or a combination thereof.

The structural derivative may be a heterocyclic compound, and may include, for example, pyrrolidine, piperidine, or a combination thereof.

For example, the zeolite sol may be synthesized adding a silica source, an aluminum source, and a structural derivative to an aqueous alkali hydroxide solution including sodium hydroxide, potassium hydroxide, calcium hydroxide, magnesium hydroxide, or a combination thereof, and performing a reaction.

The silica source and the aluminum source may be added in a mole ratio of about 5:1 to about 15:1, for example, about 10:1. When the mole ratio of the silica source is less than about 5, the amount of acid sites in the reaction may decrease and the reactivity may deteriorate. The intensity of the acid sites may decrease or crystallinity may decrease. When the mole ratio of the silica source exceeds about 15, aluminum may be added to the ferrierite or ZSM5-5 structure in addition to the formation of acid sites, thereby reducing the strength of the acid sites or reducing crystallinity.

The structural derivative may be added in an amount of about 0.5 parts by mole to about 15 parts by mole, for example about 0.9 parts by mole to about 10 parts by mole based on 1 part by mole of the silica source and the alumina sources. If the amount of the structural derivative is less than about 0.5 parts by mole, the ferrierite structure cannot be formed and only the ZSM-5 structure may be formed. If the amount of the structural derivative exceeds about 15 parts by mole, the amount of acid sites generated after synthesis may decrease to affect the catalyst reactivity.

As an example, the zeolite sol synthesis reaction may be performed by rotating at about 15° C. to about 40° C. at about 300 rpm to about 800 rpm and reacting for about 1 day to about 2 days. When the zeolite sol synthesis reaction temperature is less than about 15° C., the size and crystallinity may be lowered in the formation of the zeolite sol, and when it exceeds about 40° C., the size of the zeolite sol may be excessively grown. When the zeolite sol synthesis reaction time is less than about one day, the crystallinity of the zeolite sol may be low, and when it exceeds about two days, the size of the zeolite sol may become excessively large.

The emulsion phase is formed by mixing an alcohol with an organic template.

The alcohol may include ethanol, propanol, butanol, heptanol, or a combination thereof.

The organic template may be an organic compound including 15 to 30 carbons and at least one nitrogen, for example, cetrimonium bromide (CTAB), sodium dodecyl sulfate, ammonium lauryl sulfate, or a combination thereof.

The emulsion phase may be formed by mixing about 5 parts by weight to about 15 parts by weight of alcohol based on 1 part by weight of the organic template, for example, by mixing about 6 parts by weight to about 8 parts by weight of the alcohol based on 1 part by weight of the organic template. When an amount of the alcohol is less than about 5 parts by weight, the emulsion phase may not be sufficiently generated in the emulsion forming process, and when it exceeds about 15 parts by weight, the emulsion phase is not generated in the emulsion forming process and interferes with an action of the organic template, so that a third crystal structure may appear.

The zeolite sol is added to the emulsion and is reacted to synthesize zeolite.

For example, the zeolite sol may be added dropwise to the emulsion phase using a syringe pump or the like.

The zeolite synthesis reaction may be performed by hydrothermal synthesis at about 140° C. to about 160° C. for about 48 hours to about 336 hours, for example, by hydrothermal synthesis at about 140° C. to about 160° C. for about 96 hours to about 168 hours. When the zeolite synthesis reaction temperature is less than about 140° C., too small crystals are formed and crystallinity may be lowered and when it exceeds 160° C., the growth of the crystal may be excessive and the size of the crystal may increase. When it is less than about 48 hours, the crystal size may be too small due to little crystal growth, and when it exceeds about 336 hours, a structural problem may occur due to excessive crystal growth.

At this time, the zeolite synthesized in the emulsion phase may be a Na-form zeolite, and may further include an ion-exchange by exchanging it with a cation to prepare an $NH_3$-form zeolite.

For example, the process of immersing the Na-form zeolite in an aqueous solution of ammonium nitrate ($NH_4NO_3$), and stirring at about 60° C. to about 80° C. for about 3 hours or more is repeated 3 to 6 times to ion-exchange to an $NH_4^+$ form and thus an $NH_3$-form zeolite is prepared.

Additionally, the ion-exchanged zeolite may be converted into H-from zeolite by calcining at about 450° C. to about 650° C. for about 3 hours to about 6 hours. When the calcination reaction temperature is less than about 450° C., the removal of ammonium ions is not sufficient, so OH bonds (Brönsted acid sites) may not be sufficiently generated, and when it exceeds about 650° C., the zeolite structure itself may collapse. When the calcination reaction time is less than 3 hours, the OH bond (Brönsted acid site) may not be sufficiently formed because the removal of ammonium ions is not sufficient, and when it exceeds about 6 hours, the zeolite structure itself may collapse.

In the method for preparing the catalyst, a zeolite having both a ferrierite (FER) structure and a ZSM-5 structure may be synthesized by synthesizing a zeolite in an emulsion phase using alcohol. At this time, the acidic characteristics and crystal structure of the zeolite may be changed by changing the type and amount of the alcohol and the synthesis time. Due to this, the gasoline reactivity of dimethyl ether may be increased and the selectivity of a specific gasoline region may be increased.

The catalyst for gasoline reaction of dimethyl ether according to another embodiment includes a zeolite having a ferrierite (FER) structure and a ZSM-5 structure as prepared by the above preparation method.

When ZSM-5 zeolite is applied to the gasoline reaction of dimethyl ether, the selectivity of C8, which is a key component in the gasoline field, is not high. In addition, it is known that ferrierite (FER) zeolite is not reactive in the gasoline reaction of dimethyl ether. On the other hand, a zeolite having the ferrierite (FER) structure and the ZSM-5 structure at the same time has excellent reactivity in continuous gasoline production and has very good selectivity of C8.

For example, in the zeolite including the ferrierite (FER) structure and the ZSM-5 structure, the ferrierite (FER) structure and the ZSM-5 structure may be mixed in a mole ratio of about 1:0.01 to about 1:2, for example, about 1:0.05 to about 1:1. When the mole ratio of the ZSM-5 structure is less than about 0.01, the deactivation of the catalyst may be large because the ZSM-5 structure with high stability in the DTG (DME-to-gasoline) reaction is small. When it is greater than about 2, the selectivity of products of C5 or more, which is an advantage of the presence of large-sized membered rings, may be lowered.

In addition, the Si/Al mole ratio of the zeolite may be about 5 to about 15, for example, about 9 to about 11. When the Si/Al mole ratio of the zeolite is less than about 5, the amount of acid sites serving as reaction points may be too small, and the reactivity may be severely reduced. When it is greater than about 15, aluminum is excessively embedded in the ferrierite structure and thus the strength of the acid sites may be weakened or the ferrierite characteristic crystal itself may not be formed.

Hereinafter, specific examples of the disclosure are described. However, the examples described below are for illustrative purposes only, and the scope of the disclosure is not limited thereto.

Experimental Example 1: Synthesis Method of Zeolite

1) Synthesis of zeolite sol in which silica source, aluminum source, and structural derivative are mixed A basic silica solution and a structural derivative of pyrrolidine are stirred for 1 hour. This solution is further continuously stirred for 1 hour, and an aluminum source is added thereto and then, further continuously stirred for II hours. Herein, a ratio of Si added in the beginning and Al added after the stirring is adjusted to synthesize a final product having an Si/Al mol ratio of 10.

2) Formation of Emulsion Phase and Synthesis of Zeolite

CTAB and alcohol are mixed to form an emulsion phase, and zeolite sol is added dropwise to the emulsion phase by using a syringe pump.

Subsequently, a hydrothermal synthesis is performed and continued at 160° C. for 4 days to 7 days. After 4 days to 7 days, a product therefrom is washed with distilled water, dried overnight at 60° C. to 110° C., and fired at 550° C. for 6 hours. Herein, Na-form zeolite is completed.

The completed zeolite is 6 times repeatedly ion-changed at 80° C. for 3 hours by using 1 M $NH_4NO_3$. After the ion exchange, the obtained product is fired at 550° C. for 3 hours, completing synthesis of a catalyst.

The synthesized catalyst is named to be E-FER ($x_1$,y,z)-$T_1$ to $T_2$, or E-ZSM-5 ($x_{2,3,4}$,y,z)-$T_1$ to $T_2$. Herein, x represents a type of alcohol used for forming the emulsion phase, $x_1$ represents propanol, $x_2$ represents ethanol, $x_3$ represents butanol, $x_4$ heptanol, y represents the number of the alcohol, z represents the number of synthesis days, and $T_1$ to $T_2$ represents a reaction temperature range. In the naming, E-FER or E-ZSM-5 is picked according to crystallinity on XRD.

Example 1

E-FER (propanol,0.43,4)-330 to 290 catalysts are prepared according to the same method as Experimental Example 1.

Example 2

E-ZSM-5 (Ethanol,0.43,4)-330 to 290 catalysts are prepared according to the same method as Experimental Example 1.

Example 3

E-ZSM-5 (ethanol,0.43,4)-330 to 290 catalysts are prepared according to the same method as Experimental Example 1.

Example 4

E-FER (propanol,0.43,7)-330 to 290 catalysts are prepared according to the same method as Experimental Example 1.

Example 5

E-ZSM-5 (ethanol,0.43,7)-330 to 290 catalysts are prepared according to the same method as Experimental Example 1.

Example 6

E-ZSM-5 (butanol,0.27,7)-330 to 290 catalysts are prepared according to the same method as Experimental Example 1.

Example 7

E-ZSM-5 (heptanol,0.27,7)-330 to 290 catalysts are prepared according to the same method as Experimental Example 1.

Comparative Example 1

Commercially available ZSM-5 zeolite is used as a catalyst.

The catalyst used in Comparative Example 1 is called to be CZSM-5-$T_1$ to $T_2$. Herein, $T_1$ to $T_2$ is a reaction temperature and may be 330° C. 320° C., 310° C., 300° C., and 290° C.

Comparative Example 2

A catalyst prepared by mixing commercially available ZSM-5 zeolite and commercially available ferrierite zeolite in a weight ratio of 1:1 is used.

The catalyst used in Comparative Example 2 is called to be VFER and CZSM-5 (1:1 wt % mixing)-$T_1$ to $T_2$. Herein, $T_1$ to $T_2$ is a reaction temperature and may be 330° C., 320° C., 310° C., 300° C., and 290° C.

Comparative Example 3

Commercially available ferrierite zeolite is used as a catalyst.

The catalyst used in Comparative Example 3 is called to be VFER-330. Herein, 330 denotes a reaction temperature (° C.).

Comparative Example 4

Nanosheet ferrierite zeolite is synthesized and used as a catalyst.

The catalyst used in Comparative Example 4 is called to be NSFER-310. Herein, 310 denotes a reaction temperature.

Experimental Example 2: Gasoline Reaction Experiment of Dimethyl Ether

A catalyst including the synthesized zeolite is used in a gasoline reaction of dimethyl ether, that is, a C1 to C5 or higher hydrocarbon production reaction and in particular, a reaction producing a gasoline region.

0.4 g of a zeolite catalyst is put in a fixed bed reactor and then, experimented by changing a reaction condition, while a mixed gas is flown thereinto at a predetermined flow rate.

Before the reaction, the catalyst is pre-treated. For example, the pre-treatment is performed to remove foreign particles such as water molecules and the like, which are present in the zeolite, by increasing the temperature up to 400° C. under a nitrogen gas atmosphere and maintaining it for 2 hours.

After the pre-treatment, while a mixed gas of dimethylether: nitrogen in a mole ratio of 5:95 is flown thereinto under a normal pressure at a space speed of 4400 L/$kg_{cat}$/h to 5000 L/$kg_{cat}$/h at a reaction temperature of 330° C., 320° C., 310° C., 300° C., and 290° C., the gasoline reaction is performed at each temperature for 5 hours.

A product obtained during the reaction is analyzed with respect to a composition through gas chromatography, and the analysis results are used to calculate a dimethylether conversion rate, selectivity of C1 to C5 or higher, and the like. The reaction results are shown in Table 1 and FIGS. 1 to 11.

TABLE 1

| | Zeolite catalyst | Reaction temperature | Conversion rate [DME] (mol %) | Carbon selectivity [C1-C4] (wt %) | Carbon selectivity [C5+] (wt %) | Carbon selectivity [C8] (wt %) |
|---|---|---|---|---|---|---|
| Example 1 | E-FER (Propanol, 0.43, 4)-330 to 290 | 330 | 100 | 51.2 | 48.8 | 2.5 |
| | | 320 | 100 | 48.1 | 51.9 | 3.4 |
| | | 310 | 97.9 | 45.5 | 54.5 | 4.5 |
| | | 300 | 62.5 | 37.3 | 62.7 | 5.6 |
| | | 290 | 27.8 | 38.1 | 61.9 | 4.8 |
| Example 2 | E-ZSM-5 (Ethanol, 0.43, 4)-330 to 290 | 330 | 100 | 46.3 | 53.7 | 1 |
| | | 320 | 100 | 43.6 | 56.4 | 1.4 |
| | | 310 | 100 | 41.6 | 58.4 | 1.6 |
| | | 300 | 100 | 39.3 | 60.7 | 2.3 |
| | | 290 | 100 | 36.9 | 63.1 | 3.2 |
| Example 3 | E-ZSM-5 (Butanol, 0.43, 4)-330 to 290 | 330 | 100 | 49.3 | 50.7 | 1 |
| | | 320 | 100 | 47.1 | 52.9 | 4.6 |
| | | 310 | 100 | 44.6 | 55.4 | 2.5 |
| | | 300 | 100 | 42.7 | 57.3 | 3.8 |
| | | 290 | 94.1 | 41 | 59 | 5.2 |

TABLE 1-continued

|  | Zeolite catalyst | Reaction temperature | Conversion rate [DME] (mol %) | Carbon selectivity [C1-C4] (wt %) | Carbon selectivity [C5+] (wt %) | Carbon selectivity [C8] (wt %) |
|---|---|---|---|---|---|---|
| Example 4 | E-FER (Propanol, 0.43, 7)-330 to 290 | 330 | 100 | 47.5 | 52.5 | 1.4 |
|  |  | 320 | 100 | 44.1 | 55.9 | 2.2 |
|  |  | 310 | 95 | 40.7 | 59.3 | 3.2 |
|  |  | 300 | 93.6 | 37.9 | 62.1 | 4.5 |
|  |  | 290 | 86.4 | 36 | 64 | 4.9 |
| Example 5 | E-ZSM-5 (Ethanol, 0.43, 7)-330 to 290 | 330 | 100 | 50 | 50 | 0.9 |
|  |  | 320 | 100 | 48.6 | 51.4 | 1.4 |
|  |  | 310 | 100 | 47 | 53 | 2 |
|  |  | 300 | 100 | 44.1 | 55.9 | 3.2 |
|  |  | 290 | 94.5 | 41 | 59 | 4.7 |
| Example 6 | E-ZSM-5 (Butanol, 0.27, 7)-330 to 290 | 330 | 100 | 45.7 | 54.3 | 0.4 |
|  |  | 320 | 100 | 43.5 | 56.5 | 0.8 |
|  |  | 310 | 100 | 42.5 | 57.5 | 1.4 |
|  |  | 300 | 100 | 41.2 | 58.8 | 2.3 |
|  |  | 290 | 100 | 40.1 | 59.9 | 3.5 |
| Example 7 | E-ZSM-5 (Heptanol, 0.43, 7)-330 to 290 | 330 | 100 | 45.9 | 54.1 | 0.6 |
|  |  | 320 | 100 | 43.7 | 56.3 | 0.8 |
|  |  | 310 | 100 | 42.4 | 57.6 | 1.1 |
|  |  | 300 | 100 | 40.8 | 595.2 | 1.4 |
|  |  | 290 | 100 | 39.4 | 60.6 | 2.3 |
| Comparative Example 1 | CZSM-5- 330 to 290 | 330 | 100 | 51 | 49 | 0.1 |
|  |  | 320 | 100 | 47.6 | 52.4 | 0.2 |
|  |  | 310 | 88.7 | 45.2 | 54.8 | 0.3 |
|  |  | 300 | 92.9 | 44.6 | 55.4 | 0.7 |
|  |  | 290 | 73.7 | 51.3 | 48.7 | 2.3 |
| Comparative Example 2 | VFER and CZSM-5 (1:1 wt % mixing) | 330 | 100 | 49.5 | 50.5 | 1.5 |
|  |  | 320 | 100 | 48 | 52 | 1.8 |
|  |  | 310 | 100 | 46 | 54 | 2.3 |
|  |  | 300 | 100 | 44.1 | 55.9 | 2.9 |
|  |  | 290 | 100 | 42.5 | 57.5 | 3.9 |
| Comparative Example 3 | VFER-330 | 1 | 100 | 45.5 | 54.5 | 0.6 |
|  |  | 2 | 85.3 | 25.8 | 74.2 | 0.9 |
|  |  | 3 | 27.1 | 62 | 38 | 0 |
|  |  | 4 | 0 | 0 | 0 | 0 |
| Comparative Example 4 | NSFER-330 | 1 | 100 | 54 | 46.1 | 2.1 |
|  |  | 2 | 100 | 47 | 553 | 2 |
|  |  | 3 | 91 | 33 | 67.2 | 2.3 |
|  |  | 4 | 44.9 | 83 | 16.8 | 0.7 |

Referring to Table 1 and FIGS. 1 to 11, the catalysts according to Examples 1 to 7 exhibit reduced selectivity of C1 to C4 regions, improved selectivity of a gasoline region (C5 or higher), and high selectivity at a lower temperature and particularly, improved selectivity of a C8 product affecting an octane number, which is a key in gasoline, compared with the catalysts according to Comparative Examples 1 and 2.

Accordingly, unlike conventional commercially available ferrierite zeolite and commercially available ZSM-5 zeolite, the zeolite catalyst synthesized after forming the emulsion phase exhibits improved selectivity of the gasoline region (C5 or higher) and C8.

Experimental Example 3: Structural Analysis of Zeolite

Figure 12:
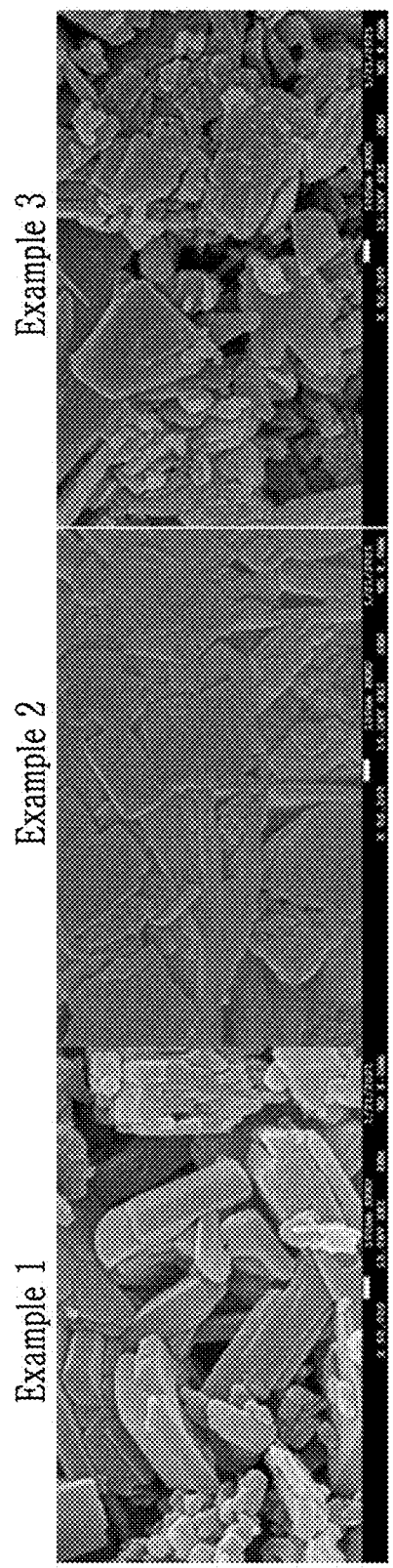
FIG. 12 shows SEM photographs of the zeolite catalysts prepared in Examples 1 to 3.

An SEM analysis of the zeolite catalysts according to Examples 1 to 3 is performed, and the results are shown in FIG. 12.

Through the SEM analysis, whether or not crystals are changed depending on synthesis conditions is visually confirmed, and in addition, the synthesized catalysts turn out to have a zeolite structure.

Figure 13:
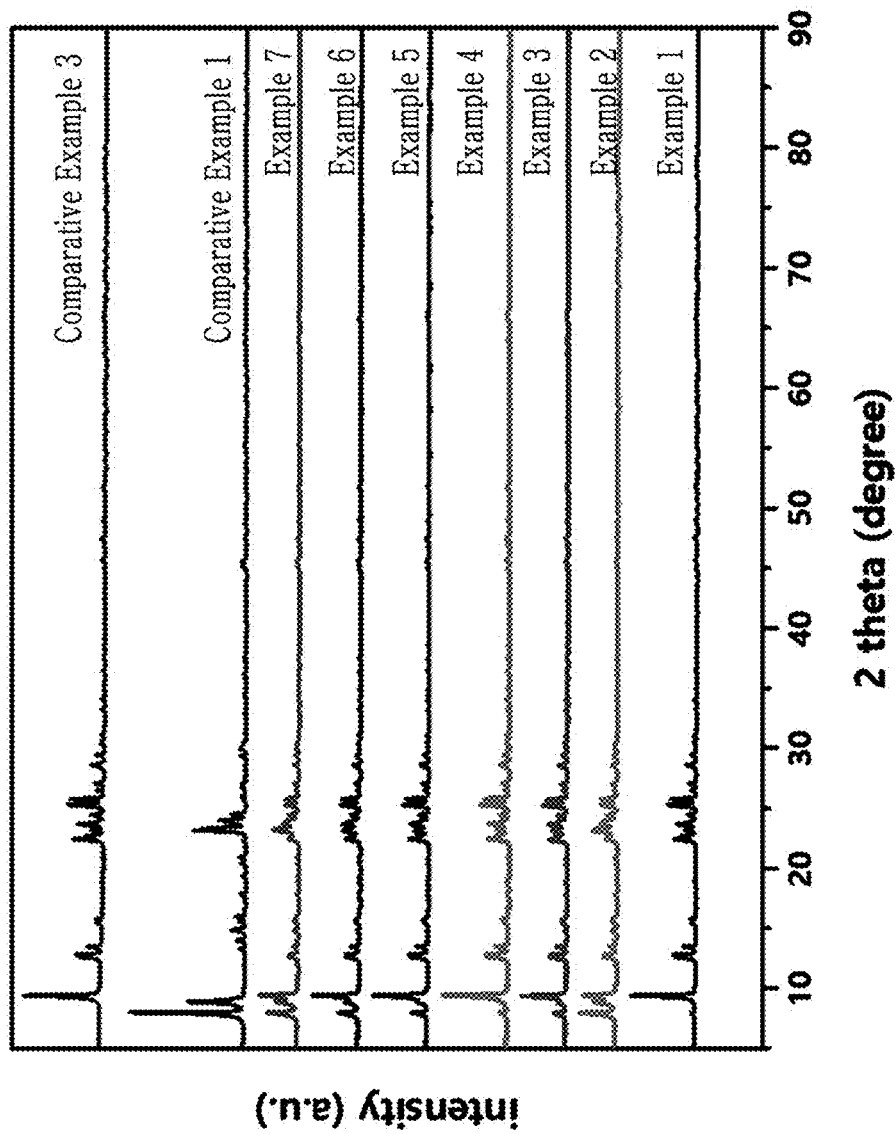
FIG. 13 is a graph showing X-ray diffraction (XRD) analysis results of the zeolite catalysts measured in Experimental Example 3.

In addition, an X-ray diffraction analysis (XRD) of the zeolite catalysts is performed, and the results are shown in FIG. 13.

Referring to FIG. 13, the zeolite catalysts according to Examples 1 to 7 have a complex structure of ZSM-5 and ferrierite, but the zeolite catalysts according to Examples 1 and 4 have a dominant ferrierite structure in the XRD results, and the zeolite catalysts according to Examples 2, 3, 5, and 7 have a dominant ZSM-5 structure in the XRD results. In other words, the X-ray diffraction analysis shows that the unique framework structure of ZSM-5 and ferrierite is complexly generated under various synthesis conditions.

Accordingly, in order to make zeolite complexly including the ferrierite structure and the ZSM-5 structure, it is important to follow appropriate conditions in each synthesis process, and particularly, a type of alcohol, synthesis time and temperature, and a weight ratio of an organic template and the alcohol should be all within appropriate ranges.

Experimental Example 4: Acid Site Analysis of Zeolite Catalyst

Figure 14:
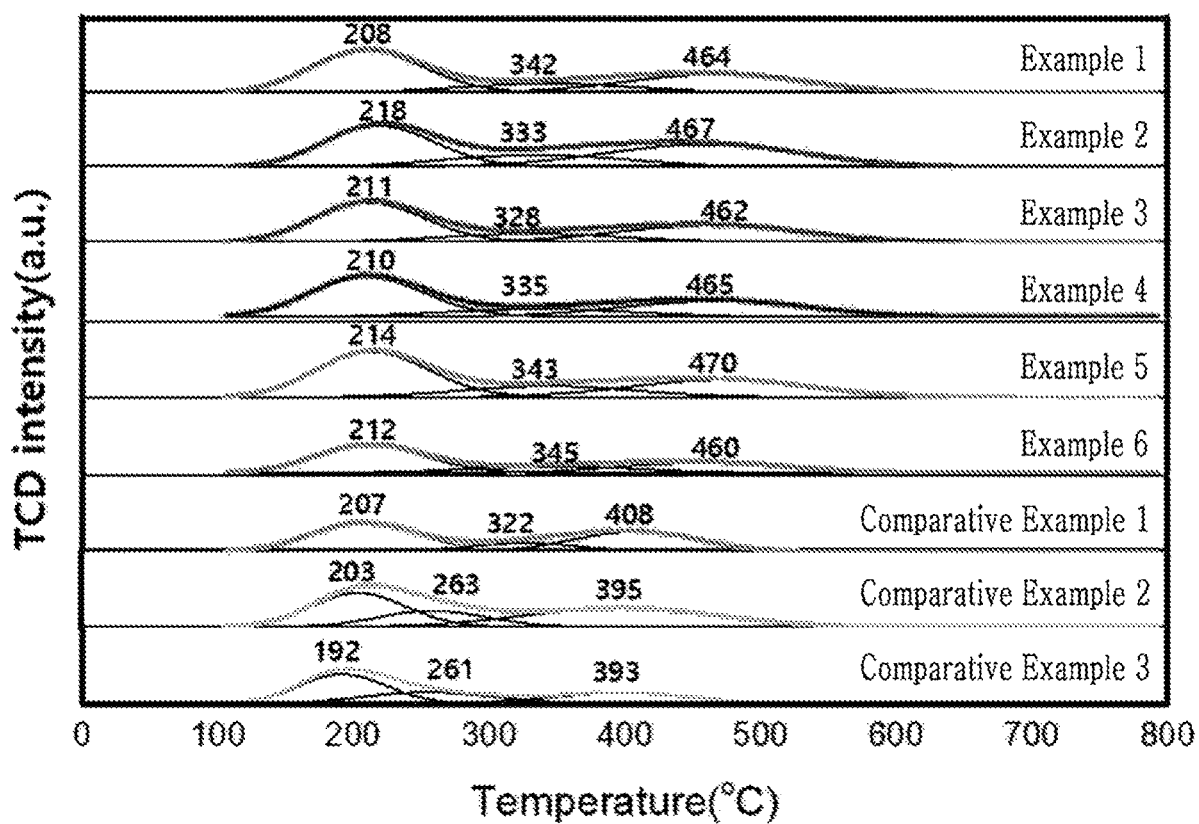
FIG. 14 is a graph showing TPD analysis results of the zeolite catalysts measured in Experimental Example 4.

A TPD analysis of the zeolite catalyst is performed, and the results are shown in FIG. 14.

The TPD analysis uses ammonia, which is a basic material, and thus is called to be $NH_3$-TPD. The ammonia is a basic material and thus adsorbed to acid sites present in the zeolite framework. The ammonia has a very small molecular size and thus may be adsorbed to all the acid sites in the zeolite.

TPD may not completely distinguish Brönsted acid sites and Lewis acid sites, but in the TPD results, a peak considered to be strong acid may be regarded as the Brönsted acid sites, while the other acid sites are regarded to be Lewis acid sites or defect sites.

Experimental Example 5: Analysis of Specific Surface Area of Zeolite Catalyst $N_2$ Sorpsion, which is a specific surface area analysis of the synthesized zeolite catalysts, is performed, and the results are shown in FIG. 15.

Referring to FIG. 15, zeolite, in which ZSM-5 is dominant in the XRD analysis results, exhibits a larger specific surface area than commercially available ZSM-5. Similarly, zeolite, in which ferrierite is dominant, has a larger specific surface area than commercially available ferrierite.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope greater than or equal to appended claims.

What is claimed is:

1. A method for preparing a catalyst comprising a zeolite for a gasoline reaction of dimethyl ether, comprising:
    reacting a silica source, an aluminum source, and a structural derivative to synthesize a zeolite sol;
    mixing an alcohol with an organic template to form an emulsion phase; and
    adding a zeolite sol to the emulsion phase to perform a zeolite synthesis reaction to synthesize a zeolite;
    wherein the structural derivative is a nitrogen-containing heterocyclic compound including pyrrolidine, piperidine, or a combination thereof;
    wherein the organic template comprises cetrimonium bromide (CTAB), sodium dodecyl sulfate, ammonium lauryl sulfate, or a combination thereof; and
    wherein the zeolite comprises a ferrierite (FER) structure and a ZSM-5 structure.

2. The method of claim 1, wherein the alcohol comprises ethanol, propanol, butanol, heptanol, or a combination thereof.

3. The method of claim 1, wherein the emulsion phase is formed by mixing about 5 parts by weight to about 15 parts by weight of alcohol based on 1 part by weight of the organic template.

4. The method of claim 1, wherein the zeolite sol is added dropwise to the emulsion phase.

5. The method of claim 1, wherein the zeolite synthesis reaction is performed at about 140° C. to about 160° C. for about 48 hours to about 336 hours.

6. The method of claim 5, which further comprises exchanging an Na-form zeolite produced in the zeolite synthesis reaction with a cation to prepare an $NH_3$-form zeolite.

7. The method of claim 6, which further comprises converting the $NH_3$-form zeolite into H-form zeolite at about 450° C. to about 650° C. for about 3 hours to about 6 hours.

* * * * *